Figure 1:
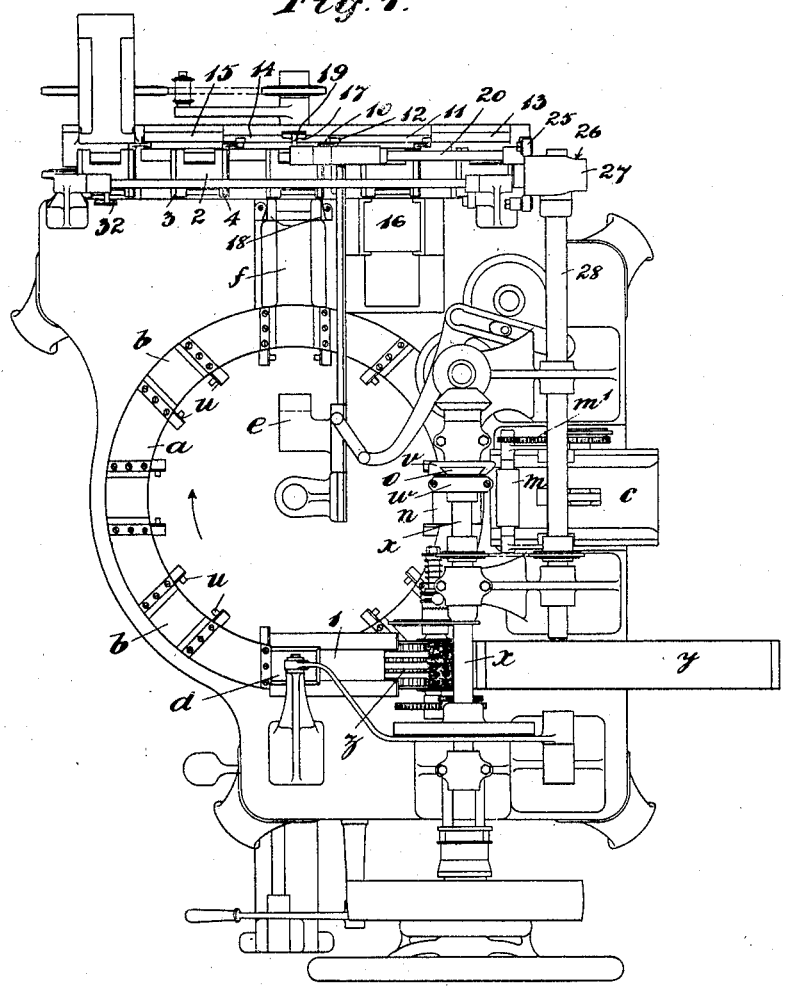

E. L. BRACY.
MACHINERY FOR PACKING CIGARETTES AND OTHER ARTICLES.
APPLICATION FILED NOV. 1, 1910.

1,041,007.

Patented Oct. 15, 1912.

7 SHEETS—SHEET 1.

Witnesses.

Inventor.

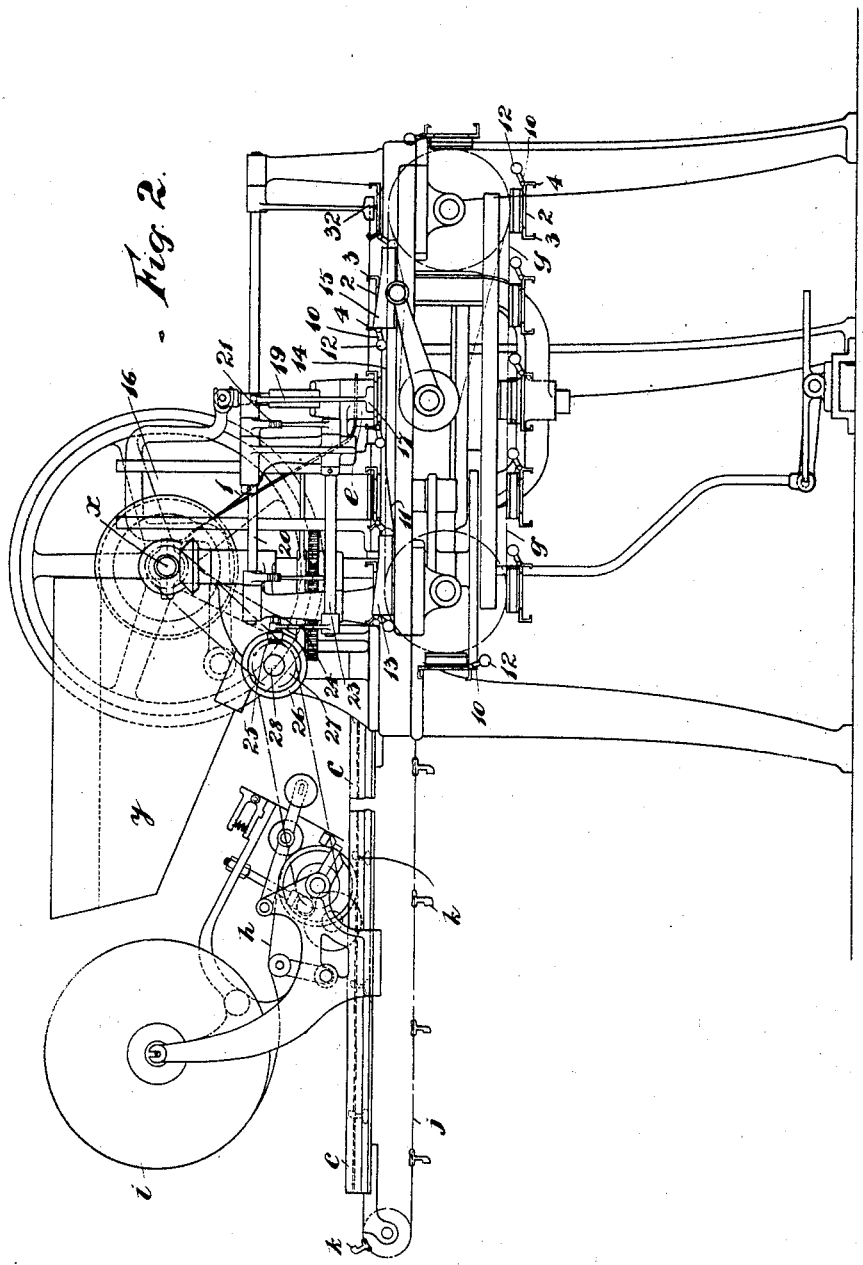

E. L. BRACY.
MACHINERY FOR PACKING CIGARETTES AND OTHER ARTICLES.
APPLICATION FILED NOV. 1, 1910.
1,041,007.
Patented Oct. 15, 1912.
7 SHEETS—SHEET 3.
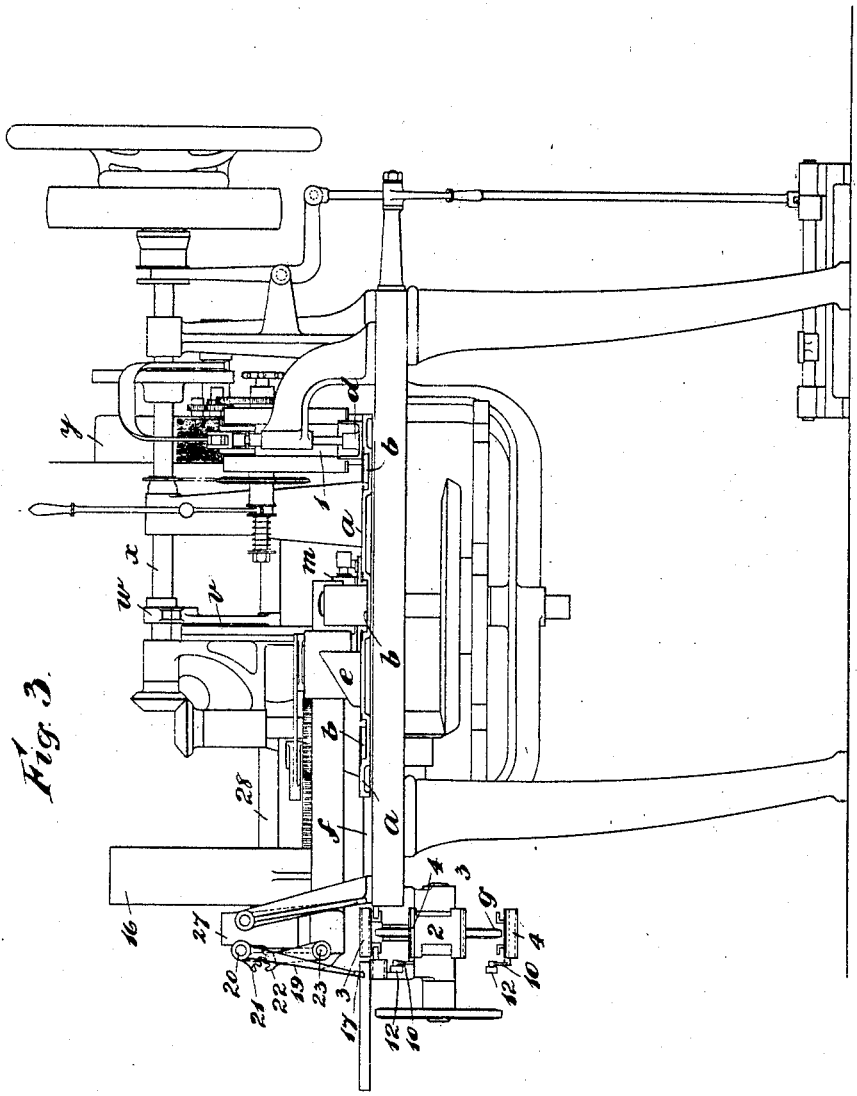
Witnesses
Inventor E. L. BRACY.
MACHINERY FOR PACKING CIGARETTES AND OTHER ARTICLES.
APPLICATION FILED NOV. 1, 1910.

1,041,007.

Patented Oct. 15, 1912.

7 SHEETS—SHEET 4.

Witnesses.
Stephen Edward Gunyon
William Anderson Smith

Inventor.
Edward Leroy Bracy

E. L. BRACY.
MACHINERY FOR PACKING CIGARETTES AND OTHER ARTICLES.
APPLICATION FILED NOV. 1, 1910.
1,041,007.
Patented Oct. 15, 1912.
7 SHEETS—SHEET 5.
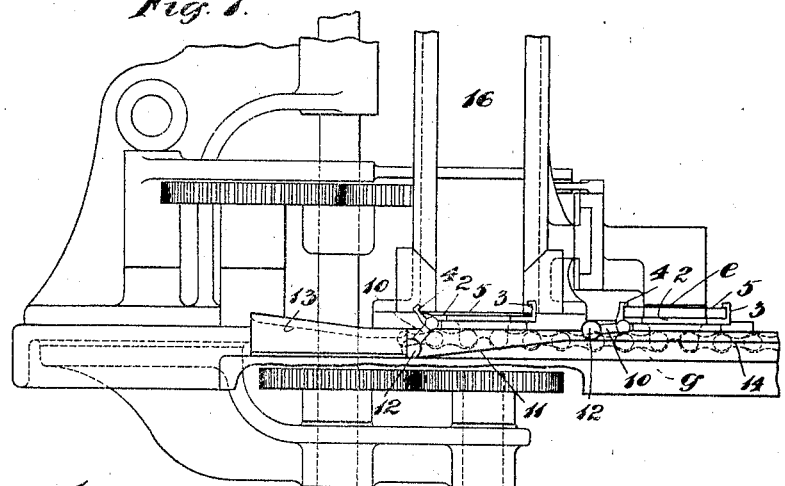
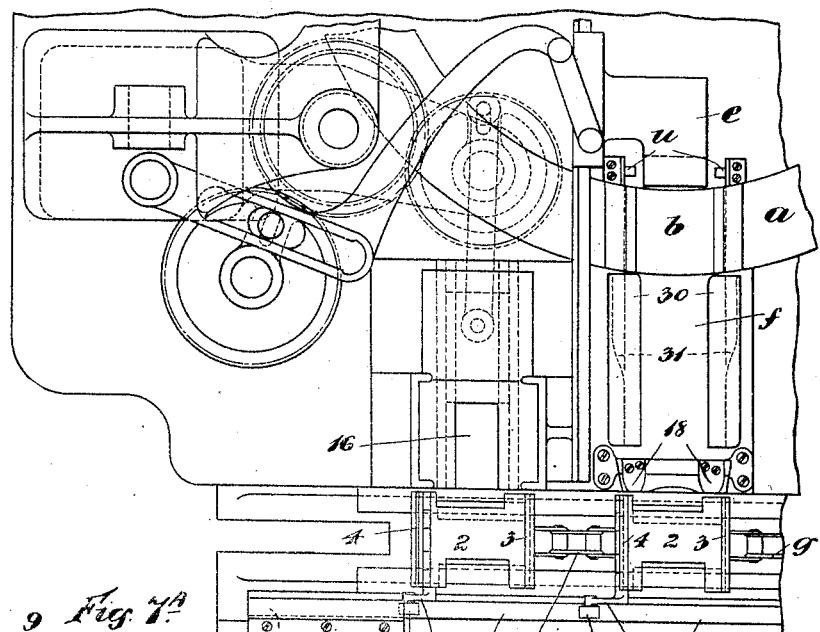
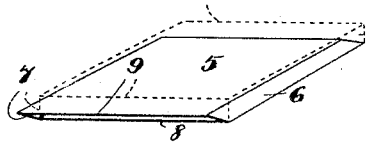
Witnesses.
Stephen Edward Gunyon
William Anderson Smith
Inventor.
Edward Leroy Bracy

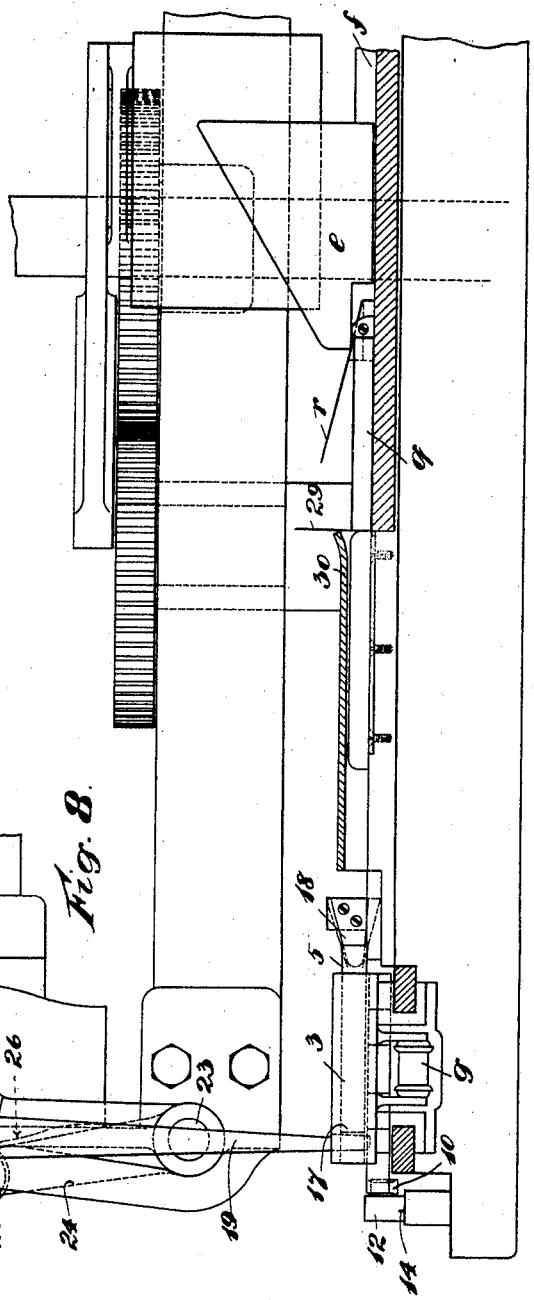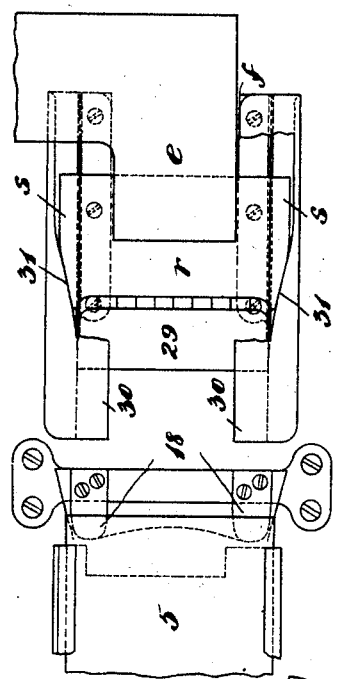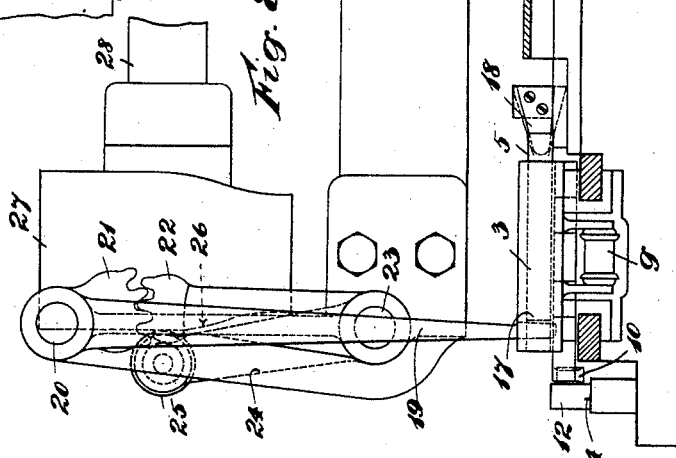

E. L. BRACY.
MACHINERY FOR PACKING CIGARETTES AND OTHER ARTICLES.
APPLICATION FILED NOV. 1, 1910.

1,041,007.

Patented Oct. 15, 1912.

7 SHEETS—SHEET 7.

Witnesses.
Stephen Edward Runyon
William Anderson Smith

Inventor.
Edward Leroy Bracy

UNITED STATES PATENT OFFICE.

EDWARD LEROY BRACY, OF SCOTLAND NECK, NORTH CAROLINA.

MACHINERY FOR PACKING CIGARETTES AND OTHER ARTICLES.

1,041,007.

Specification of Letters Patent.

Patented Oct. 15, 1912.

Application filed November 1, 1910. Serial No. 590,102.

*To all whom it may concern:*

Be it known that I, EDWARD LEROY BRACY, a citizen of the United States of America, residing at Scotland Neck, North Carolina, United States of America, have invented new and useful Improvements in Machinery for Packing Cigarettes and other Articles, of which the following is a specification.

This invention relates to improvements in machinery for packing cigarettes and other articles, of the kind for which British Letters Patent were granted to me bearing date the 19th August 1907, No. 18705, that is to say machinery in which cigarettes (for example) are introduced into trays, slides, envelops or boxes contained in recesses in a horizontally intermittently rotating plate, and the said trays, slides, envelops or boxes when charged with the cigarettes or other goods, are expelled from such recesses into a carrier-wheel provided with a number of radial pockets.

The object of my present invention is to provide means whereby paper or cardboard trays, covers or slides containing the cigarettes, and which are so shaped, creased and folded as to form complete, or partially complete envelops or wrappers made in one piece, somewhat as described in the specification of my aforesaid British Patent No. 18705, and shown in Figure 3 of the drawings accompanying that specification, can be introduced into outer covers or shells by mechanical means. These shaped and creased envelops or wrappers are fed singly or as cut from a reel into recesses in the horizontal intermittently rotated plate as described in the specification of my aforesaid British Patent No. 18705; and for the purpose of feeding these envelops or wrappers containing the cigarettes or other goods into the aforesaid outer covers or shells I employ the following devices:—Instead of the carrier-wheel marked $g$ in the drawings of my aforesaid British Specification No. 18705 provided with radial pockets $h$ to receive the filled and folded envelops or wrappers, I employ an endless chain having mounted upon it a number of pockets each adapted to receive one of the outer covers or shells intended to receive the filled envelops or wrappers. This endless chain is so arranged and operated intermittently that the pockets mounted upon it are brought one after the other opposite to the recess in the horizontal rotating plate (hereinafter called the mold-wheel) from which the filled envelop or wrapper is to be ejected. And in order that my present improvements may be clearly understood I will proceed to describe the same by the aid of the accompanying drawings in which—

Figure 5:
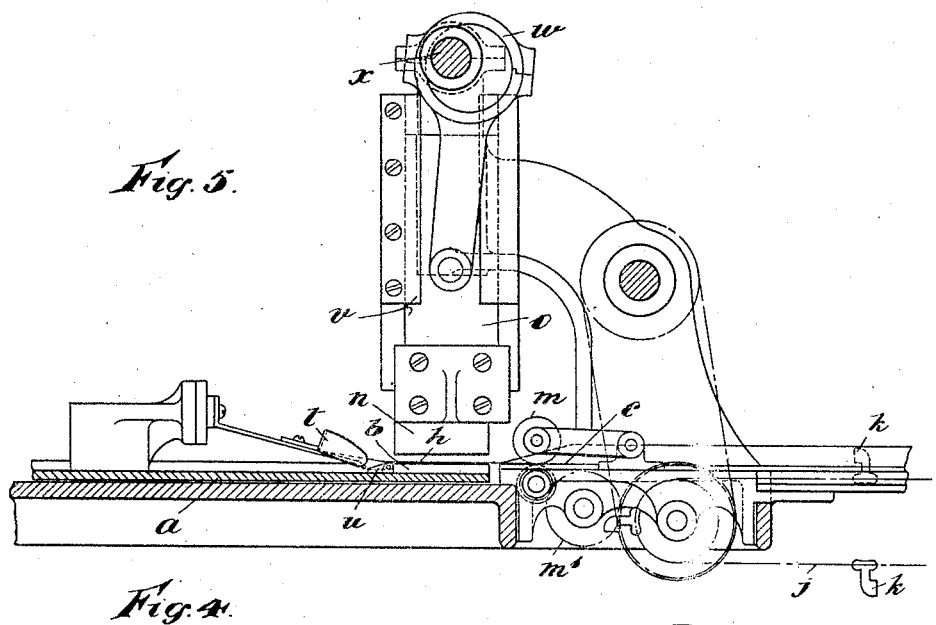
Figure 4:
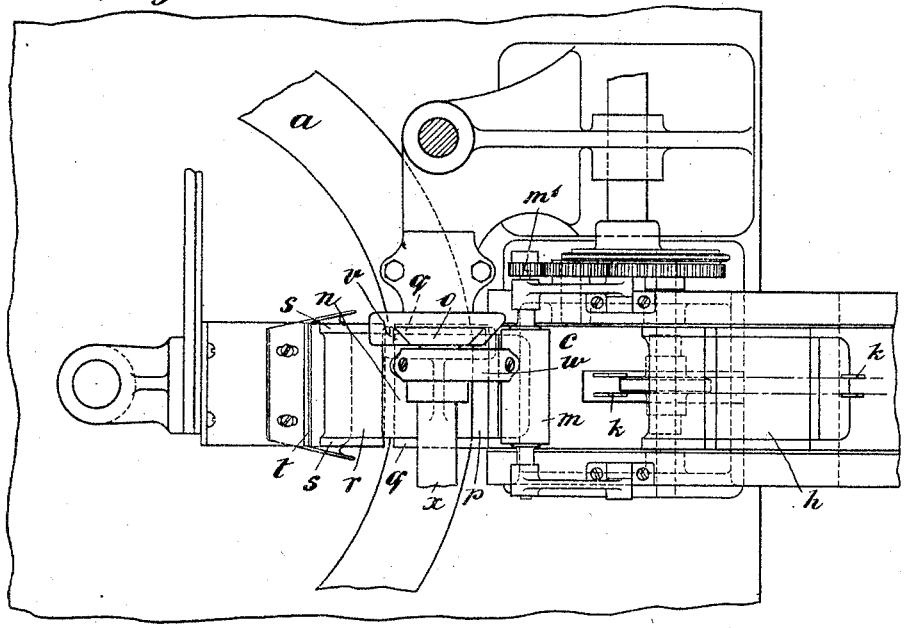
Figure 10:
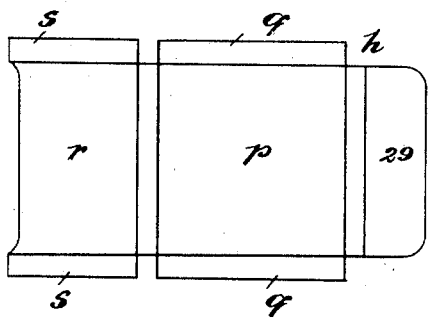
Figure 11:
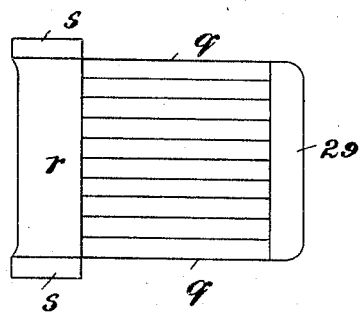
Figure 12:
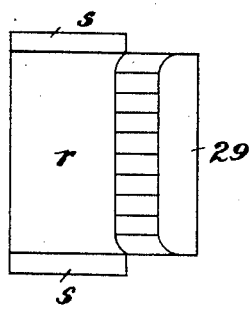
Figure 13:
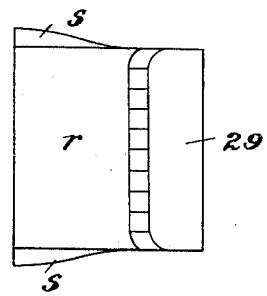
Figure 14:
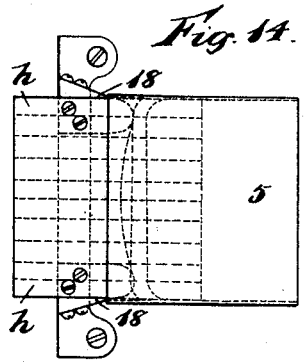
Figure 15:
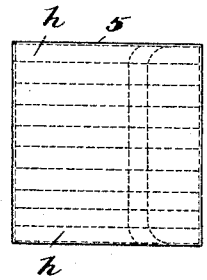

Fig. 1 is a plan of a cigarette-packing machine with my improvements applied thereto, but with the devices for conveying the envelops or wrappers removed; Fig. 2 an elevation of Fig. 1 looking from top to bottom of that figure, but with the envelop or wrapper conveyer in place; Fig. 3 an elevation looking from left to right of Fig. 1; Fig. 4 an enlarged plan view of the devices for introducing the envelops or wrappers into the mold-wheel; Fig. 5 an elevation of Fig. 4 partly in section; Fig. 6 an enlarged plan view of the devices for feeding the outer covers or shells into the beforementioned pockets on the endless chain, and the packets of cigarettes from the mold wheel into the said outer covers or shells; Fig. 7 an elevation of Fig. 6; Fig. 7$^A$ is a perspective view of the folded shell, the dotted lines indicating the shell when opened: Fig. 8 an enlarged elevation of the devices for feeding the outer covers or shells into position for receiving the packets of cigarettes; Fig. 9 a plan view of part of Fig. 8; Fig. 10 an enlarged view of an envelop or wrapper blank; Figs. 11, 12 and 13 views of the said blank in various stages of folding; Fig. 14 a view of the folded envelop or wrapper (charged with cigarettes) being introduced into the outer cover or shell; and Fig. 15 the completed packet within its outer cover or shell.

Similar letters and numerals of reference relate to like parts in all the figures of the drawings.

$a$ is the mold wheel to which a partial intermittently rotating motion is imparted in any convenient manner. $b$ are the molds in the said wheel. $c$ is a guideway along which the envelops or wrapper blanks are fed one by one into the molds $b$ as the mold-wheel is rotated. $d$ is the vertically acting plunger by which the charges of cigarettes are delivered into the envelops or wrappers as they are brought into position.

$e$ is a horizontally acting plunger by which each packet of cigarettes in turn contained within its envelop or wrapper is ejected from the mold $b$ after having been partially folded into a horizontal guideway $f$ on its way to one of the pockets of the endless chain $g$, the construction of which will be hereinafter more fully described.

Referring now to the apparatus for feeding the envelop or wrapper blank $h$, which is illustrated to an enlarged scale in Figs. 4 and 5, the paper or carton blanks $h$ are stamped out to the shape shown in Fig. 10 and may be fed into the machine one by one from a reel $i$ (see Fig. 2), suitable cutting-off and feeding mechanism being provided to effect the necessary intermittent delivery of the said blanks on to the conveyer $j$.

The blanks $h$ lie upon the conveyer $j$ between suitable carriers $k$, and are delivered by such conveyer to a pair of friction rollers $m$ (driven by means of gearing $m'$) into the position over a mold $b$ as shown in plan in Fig. 4. A plunger $n$ attached to the slide $o$ then descends and forces the blank $h$ into the mold $b$ in such a manner that the back $p$ of such blank lies at the bottom of the mold recess, its inner side flaps $q$ stand vertically therein, and the front $r$ with its outer side flaps $s$ extend radially inward over the top central portion of the mold wheel $a$, being partially folded by means of devices $t$ and $u$, the operation being completed in a manner somewhat similar to that described in the specification of my beforementioned British Patent No. 18705 of 1907, or in any other convenient manner. The plunger $n$ is guided vertically in guides $v$ and is operated by the eccentric $w$ mounted on the driving shaft $x$.

The cigarettes are stored in the hopper $y$, as shown in the general arrangement of the machine as illustrated in Figs. 1 to 3, from whence they are automatically delivered and deposited into the envelop or wrapper $h$ by means of the drum $z$, the inclined guideway $l$, and the vertically operating plunger $d$. The envelop or wrapper $h$ is then partly folded during the continued rotation of the mold wheel $a$ by successive operations as illustrated in Figs. 10 to 13 until it reaches that point in its rotation which coincides with the guideway $f$ when it is ejected by the horizontally acting plunger $e$ from the mold wheel $a$ in a partially folded condition into the guideway $f$ thence to be introduced into the outer cover or shell 5 in the pocket on the endless chain $g$ which is situated at the end of the said guideway.

Referring now to Figs. 6, 7 and 7A each of the pockets on the endless chain $g$ consists of a flat bottom 2, and two vertical sides 3 and 4, one of which (3) is rigidly connected to or formed with the bottom 2, and the other (4) is hinged thereto, so that it can be turned outwardly to stand at an angle with the bottom. When the hinged side 4 of the pocket is turned up so as to stand at right angles to the bottom the cross section of the pocket corresponds in shape and dimensions to the cross section of the outer cover or shell 5, being, however, slightly larger than the latter so that the said cover or shell may be free to fall out or to be ejected from the pocket after the filled wrapper $h$ has been placed within it.

The object of hinging the one side, 4, of the pocket to the bottom is the following:—The shells 5 are, as is well known, usually fed into packing machines, where they are used, in a flattened form as shown in Fig. 7A, that is to say with the two sides folded down to the right or left so that the top lies close down upon the bottom, one of the sides 6 lying upon the bottom 8, and the other side 7 extending in the opposite direction below the top 9; the result being that these folded down shells are wider, by the depth of one side, than the same shells when opened out to receive the filled envelops or wrappers $h$. Now it is for the purpose of opening these shells from the folded form in which they are received into the machine, into the opened form (shown in dotted lines in Fig. 7A) ready to receive the filled envelops or wrappers that this hinged side 4 of the pocket is employed, and that in the following manner:—The folded shell 5 is fed from a stack 16 or otherwise in any suitable known manner into the pocket, so that the lower edge of the side 6 which is to form the lower corner of the shell when opened out lies in the lower corner of the pocket at the side 3 opposite to the hinged side 4, while the upper edge of the side 7 of the folded shell, which is to form the upper corner of the other side of the shell when opened, comes under a flange running along the top of the hinged side 4 of the pocket, which at that time stands in its angular position relative to the bottom of the pocket. It will now be understood that on turning the hinged side 4 of the pocket into its vertical position in relation to the bottom 2, the shell will be unfolded or opened out by the lateral pressure upon it of the hinged side 4 so as to take the shape of the interior of the pocket, as shown by dotted lines in Fig. 7A, when the hinged side 4 of the pocket is closed up into the vertical position. The closing up of this hinged side 4 may be effected by any suitable mechanism, for example a lever arm 10 may be attached to the hinged side 4, its end being adapted to come into contact with a cam surface or incline 11 as the pocket approaches the position in which it is to receive the filled envelop or wrapper $h$ from the recess in the mold wheel $a$ and guideway $f$, the subsequent opening of the hinged side 4 being effected by a spring, weight or otherwise. In the arrangement shown to an enlarged scale in Figs. 6 and 7 of the drawings the opening of the hinged side 4 of the pocket at the proper time is insured by the weight or bowl 12 mounted at the end of the lever 10 coming into contact with the fixed inverted inclined surface 13, and the closed position of the hinged side 4 of the pocket is maintained during its horizontal travel by the weight or bowl 12 rolling on the surface 14 until it reaches the second inverted inclined surface 15 (Fig. 2) when it is again opened for the release or ejection of the completed packet illustrated in Fig. 15.

The pockets on the lower part of the endless chain g are normally closed, that is to say with the hinged side 4 turned into its vertical position, and those on the upper part of the said chain are normally open, that is to say with the hinged side 4 turned in the angular position. The intermittent motion of the endless chain g brings each pocket successively opposite a recess or mold b in the mold-wheel a from which a filled envelop or wrapper is to be ejected. As the pocket in its open condition comes opposite the stack 16, or other feeding device, of folded shells it receives one of the latter as above described; further movement of the pocket brings the lever arm 10 of the hinged side 4 into contact with the cam surface or incline 11, and the hinged side 4 is turned up into its vertical position opening out the shell as above described, and maintaining it in that condition until it arrives opposite the recess in the mold wheel. The usual pushing devices e then come into operation to push the filled envelop or wrapper out of the recess b in the mold-wheel a into the shell 5 in the pocket on the endless chain g. The chain makes another movement carrying the just filled pocket forward a step, the hinged side 4 is then again opened and the shell 5 with the filled envelop or wrapper in it may be ejected from the pocket by the pendant plunger 32.

For the purpose of holding the shell 5 open in the pocket until the filled envelop or wrapper has entered the same, devices such as those described in the specification of a British patent granted to me dated the 14th December 1906 No. 28564, especially with reference to Figs. 5 and 6 of the drawings accompanying that specification, may be employed.

The shells 5 may be prevented from being pushed out of the pockets on the endless chain g (by the forcing into them of the filled envelops or wrappers,) by closing the back end of each pocket, but preferably by means of a plunger 17 adapted to press the shell 5 a short distance out of the pocket, so as to force the front end of the said shell on to the above mentioned spring devices 18 for holding the shell 5 open; as will be seen on reference to Figs. 8 and 9 of the drawings. The plunger 17 has imparted to it, by suitable mechanism, an oscillating movement synchronously with the other movements of the machine. For example such mechanism may consist of the pendant bar 19 the end of which carries the plunger 17. The bar 19 is mounted on a shaft 20, and is oscillated by the toothed sectors 21 and 22. The sector 22 receives motion from the rocking shaft 23, which is actuated by the arm 24, at the end of which is mounted the bowl 25 engaging with the cam surface 26 of the cam plate 27, which latter is mounted upon and rotates with the shaft 28. By the above described mechanism the shell is brought into the position shown in Figs. 8 and 9 ready to receive the completely filled and folded envelop or wrapper, which has been transferred from the mold b in the mold-wheel a (by the movement of the plunger e) into the horizontal guideway f, where the folding operation is completed preparatory to the envelop or wrapper being introduced into the outer cover or shell 5. The end or top flap 29 of the envelop or wrapper h is folded down by means of the stationary shoes 30 (Figs. 8 and 9), and the sides s of the front r of the envelop or wrapper are folded down by the stationary shoes 31 during the further travel of the plunger e in the course of delivery of the wrapper with its contents between the spring devices 18 into the outer cover or shell 5. The successive acts of folding and delivering are clearly illustrated in Figs. 10 to 15 as hereinbefore described.

Metallic foil or tissue paper lining may be fed in over the envelops or wrappers before the cigarettes are packed into them, and such foil or tissue paper may be taken from a roll and cut into suitable lengths by any suitable devices operated from the main shaft or otherwise.

In cases where it is required to inclose the cigarettes entirely in an envelop or wrapper of the kind for example illustrated in Fig. 3 of the drawings of my British Patent No. 18705 of 1907, the outer shells or wrappers 5 may be dispensed with, the flaps of the envelop or wrapper being gummed and folded in the well-known manner. For this purpose the horizontal guideway f may be made of such a length as to allow of the introduction of any known description of gumming and folding devices, and the gummed and closed packets only may be passed into the pockets of the chain g and be retained therein until the gum has set or dried. For this purpose the chain may be of greater length than is shown in the accompanying drawings, and if desired may be made to pass through a heated or drying tube, or other means may be provided for the drying or setting of the gum. Each packet may be arranged to travel with the chain until it is again brought opposite the horizontal guideway f when it may be ejected by the action of the packet then in the guideway being forced into the pocket of the chain $g$. And the said ejected packet may be forced into a further guideway on the opposite side of the pocket in the chain $g'$ where its flaps may be held in place for a further period until it is finally ejected from the outer end of such guideway by the successive entrance of other packets behind it.

Claims.

1. An improved machine for packing cigarettes and other articles, which comprises, in combination, an intermittently rotating mold-wheel provided with mold-recesses, devices for feeding the shaped paper or carton blanks intended to form the envelops or wrappers, in a flat condition, over the mold-recesses, a plunger for forcing a part of each blank into a mold-recess, devices for delivering the charge of goods into that part of the blank which is within the mold-recess, a plunger for forcing the goods into the said part of the blank, devices for folding the top and bottom ends of the thus partly formed envelop or wrapper so as to more or less completely inclose the goods within the latter, a fixed guideway provided with stationary shoes for completing the folding of the envelop or wrapper, a horizontally acting plunger for forcing the partly formed envelop or wrapper with its contents out of the mold-recess into and through the said fixed guideway, and an intermittently moving endless chain provided with pockets, each having a hinged side, for receiving, opening and holding the outer covers or shells while the completely folded envelops or wrappers with their contents are being delivered from the fixed guideway into the said outer covers or shells by the horizontally acting plunger, substantially as described.

2. In a machine for packing cigarettes and other articles, and in combination, an intermittently rotating mold-wheel $a$ provided with mold-recesses $b$ for receiving the envelops or wrappers and the goods, a fixed guideway $f$ provided with stationary folding shoes 30 and 31 for completing the folding of the envelops or wrappers, an endless chain for receiving the outer covers or shells in a collapsed condition and for pressing the same into the open position for receiving the envelops or wrappers with their contents from the fixed guideway, and a horizontally acting plunger $e$ for forcing the envelop through the fixed guideway $f$ and into the covers or shells carried on the endless chain, substantially as described.

3. In a machine for packing cigarettes and other articles, having an intermittently moving chain $g$ with pockets mounted thereon, spring devices for facilitating the reception by the covers or shells, of the packets of the goods, devices for pressing back the outer covers or shells from the said pockets onto the said spring devices, which consist of the plunger 17, bar 19, connected to said plunger, shaft 20 carrying said bar 19, sector gear 21 on said shaft, rocking shaft 23, sector gear 22 carried thereby, lever 24, carried by said shaft 23, cam plate 27 for operating said lever, and means for operating the cam plate, substantially as described.

4. In a machine for packing cigarettes and other articles, the pockets mounted on the intermittently moving endless chain $g$, for receiving and manipulating the outer covers or shells, each of which pockets consists of a bottom 2, a fixed side 3 standing at right angles to the said bottom, a side 4 hinged to the said bottom and having a flange $4^x$ for overhanging the edge of the packet, and devices for turning the said side 4 so as to open the pocket in order to receive the outer cover or shell 5, and to close the same in order to open and hold the said outer cover or shell, substantially as described.

5. In a machine for packing cigarettes and other articles, the pockets mounted on the intermittently moving endless chain $g$, each of which pockets has a side 4 hinged to the bottom and provided with a flange $4^x$ for overhanging the packet, cam surfaces 13, 11, 14 and 15, and a lever 10 with weight 12 for turning the hinged side 4 of the pocket into the open and closed positions, combined and arranged substantially as described.

In testimony whereof I have signed my name to this specification in the presence of two subscribing witnesses.

EDWARD LEROY BRACY.

Witnesses:
  STEPHEN EDWARD GUNYER,
  HERBERT D. JAMIESON.